United States Patent [19]
Kim et al.

[11] Patent Number: 5,894,464
[45] Date of Patent: Apr. 13, 1999

[54] HOLOGRAM OPTICAL PICK-UP USING TWO LASER SOURCES

[75] Inventors: Jin-hwan Kim; Hyun-kuk Shin, both of Kyonggi-do, Rep. of Korea

[73] Assignee: Samsung Electronics Co., Ltd., Kyungki-do, Rep. of Korea

[21] Appl. No.: 08/936,529

[22] Filed: Sep. 24, 1997

[30]     Foreign Application Priority Data

Sep. 24, 1996 [JP] Japan ................................. 8-42120

[51] Int. Cl.⁶ ..................................................... G11B 7/00
[52] U.S. Cl. ......................... 369/103; 369/94; 369/44.37; 369/112; 369/109
[58] Field of Search ................................. 369/103, 112, 369/94, 44.12, 44.23, 109, 44.37

[56]         References Cited

U.S. PATENT DOCUMENTS 5,696,750  12/1997  Katayama ........................... 369/112
5,745,304   4/1998  Choi ................................. 369/44.14
5,768,221   6/1998  Kasami et al. ....................... 369/94

*Primary Examiner*—John W. Cabeca
*Assistant Examiner*—Kim-Kwok Chu
*Attorney, Agent, or Firm*—Sughrue, Mion, Zinn, Macpeak & Seas, PLLC

[57]         ABSTRACT

A hologram optical pick-up device using a first and second laser sources emit laser beams having different wavelengths, which are then focused by an objective lens on a disc, and reflected at a surface of the disc. The reflected laser beams are diffracted by a first hologram or a second hologram, and then received by a first photo detector or a second photo detector. Accordingly, a laser beam having an adjustable wavelength according to a thickness and a recording surface of the disc is emitted by the first laser source or the second laser source in order compensate the aberration of the laser beam due to the thickness of the disc. Thereby, the same hologram optical pick-up device can reproduce data from discs having different recording surfaces without loss of data. Also, the hologram optical pick-up can record and reproduce data on/from any disc with an increased efficiency of the laser beam.

7 Claims, 2 Drawing Sheets

HOLOGRAM OPTICAL PICK-UP USING TWO LASER SOURCES

BACKGROUND OF THE INVENTION

1. Field of the Invention

The present invention relates to an optical pick-up capable of recording and reproducing data on and from discs having different thickness, and more particularly to a hologram optical pick-up capable of recording and reproducing data on and from any kind of disc by using two laser sources emitting laser beams having different wavelengths, thereby improving efficiency of the laser beams.

2. Prior Arts

A conventional compact disc is well known as a recordable and reproducible optical medium. The compact disc generally is a substrate having a thickness of 1.2 mm and has a reflecting surface as a recording layer. Information such as a sound, a character, a graphic, and the like, are recorded in a form of pits on the reflecting surface. A digital video disc with a substrate having a thickness of 0.6 mm also has been developed as a recordable and reproducible optical medium. Information including image data are stored with high density in the digital video disc.

An optical pick-up for the digital video disc differs from an optical pick-up for the compact disc. The optical pick-up of the digital video disc includes a laser diode emitting laser beams having a short wavelength and an object lens having a high numerical aperture. Thereby, the optical pick-up of the digital video disc collects the laser beams and focuses the laser beams in a form of fine spots on a disc to reproduce data recorded with high density from the disc. On the other hand, recently, a phase changeable disc on which data are recorded only once and reproduced from has been developed. The phase changeable disc has the same thickness as that of the compact disc but has a different recording layer from the compact disc. The surface of the compact disc has pits formed as the data recording layer, whereas the phase changeable disc has phase changeable materials, by which a reflecting ratio of the laser beams during data recording is different from a reflecting ratio of the laser beams during data reproducing in a range of certain wavelength regions. The optical pick-up can record and reproduce data on the phase changeable disc and compact disc under the same environment.

As discs having different thicknesses or recording materials have been developed, optical pick-ups capable of using different discs has been required. Accordingly, an optical pick-up capable of recording and reproducing data on and from both a digital video disc and a compact disc has been provided. The optical pick-up capable of recording and reproducing the data on and from both the digital video disc and the compact disc generally uses a laser diode emitting laser beams having a short wavelength, for example, a wavelength of 650 nm, and can adjust a numerical aperture of an object lens with correspondence to the thickness of a disc to be reproduced. During data reproduction of the digital video disc, the optical pick-up focuses laser beams into a small spot on the digital video disc by using the object lens with a numerical aperture of 0.6, and during data reproduction of the compact disc, the optical pick-up makes the diameters of the laser beams, incident from the laser diode to the object lens, small or causes the laser beams to pass through a portion, for example, short axis portion at which the numerical aperture is 0.45, at which the numerical aperture is lower in the object lens. Thereby it is possible to compensate for an aberration of the laser beams. In the optical pick-up applying to both the digital video disc and the compact disc as described above, a surface emitting laser diode is used as a laser source, and a hologram is used as an element adjusting the numerical aperture of the object lens.

Referring to FIG. 1, a hologram plate 2 having first and second holograms 3 and 4 at both sides thereof is positioned in front of a laser source 1. A collimate lens 5 and an object lens 6 are disposed respectively in front of the hologram plate 2.

The laser source 1 emits laser beams. The laser beams pass through the hologram plate 2, which in turn are modulated into parallel beams by the collimate lens 5. Then, laser beams are incident into and focused by the object lens 6 on a digital video disc 7 and a compact disc 8. The laser beams are reflected by the digital video disc 7 and the compact disc 8 and pass again through the object lens 6 and the collimate lens 5. Then, the laser beams are diffracted by the holograms 3 and 4 and detected by first and second photo detectors 9 and 10.

During data reproduction of the digital video disc 7, the laser beams passing through the first hologram 3 are focused into a small spot on the digital video disc 7 by using the numerical aperture of the object lens 6. The reflected laser beams are diffracted by the first hologram 3 and received by the first photo detector 9. The first photo detector 9 changes intensity of the laser beams into electric signals. On the other hand, during data reproduction the compact disc 8, laser beams are made to pass through the second hologram 4 having a small area and the portion at which the numerical aperture of the object lens 6 is lower. Thereby, it is possible to compensate for the aberration of the laser beams generated due to the thickness difference between the digital video disc and the compact disc. Then, the laser beams are focused in a form of spots on the compact disc 8. The laser beams are reflected by the compact disc and diffracted by the second hologram 4, which in turn are detected by the second detector 10.

In the conventional optical pick-up as described above, however, since the optical pick-up uses the laser source emitting the laser beams which have the short wavelength as to focus the laser beams in the form of fine spots on the digital video disc, there is a disadvantage in that when the optical pick-up reproduces data from the phase changeable disc, the data can be destroyed due to properties of the phase changeable material.

Furthermore, in the conventional optical pick-up, the optical environment generally is adjusted for the digital video disc having a thinner thickness, thus there is a problem in that it is impossible to reproduce the data from the compact disc in good condition because during the reproduction of data from the compact disc, there is a loss of the laser beams which reach the photo detector, resulting in a deterioration of the reproducing signal.

SUMMARY OF THE INVENTION

Therefore, the present invention has been made to overcome the above described problems of the prior art, and accordingly it is an object of the present invention to provide an optical pick-up which has an improved hologram, for recording and reproducing data on and from discs having different thicknesses and different recording materials, for example, a recordable compact disc, an magneto optical disc, and the like.

Another object of the present invention to provide an optical pick-up using a hologram, capable of recording and reproducing data on and from any disc having different thickness under a suitable environment.

To achieve the above objective, the present invention provides a hologram optical pick-up using two laser sources comprising:

first and second laser sources for respectively emitting laser beams having different wavelengths;

an objective lens for focusing the laser beams emitted from the first and second laser source on surfaces of discs having different thicknesses;

a hologram plate having first and second holograms formed on both sides thereof, the first and second holograms respectively diffracting the laser beams which are emitted from the first and second laser sources and reflected by discs; and first and second photo detectors for receiving the laser beams which are reflected by the discs and diffracted by the first and second holograms so as to detect signals.

The first laser source emits a laser beam having wavelengths of 670 nm and the second laser source emits a laser beam having wavelengths of 780 nm.

The discs having different thicknesses include a digital video disc and a compact disc.

The discs having different thicknesses also include a digital video disc and a recordable compact disc.

The first and second laser sources and the first and second photo detectors are disposed on the same surface.

The hologram only diffracts the reflected laser beam of the first laser source corresponding thereto and the second hologram only diffracts the reflected laser beam of the second laser source corresponding thereto.

BRIEF DESCRIPTION OF THE DRAWINGS

The above objectives, and other features and advantages of the present invention will become more apparent by describing in detail preferred embodiments thereof with reference to the attached drawings, in which.

DESCRIPTION OF THE PREFERRED EMBODIMENTS

A preferred embodiment of the present invention will be described in detail with reference to the accompanying drawings.

Figure 1:
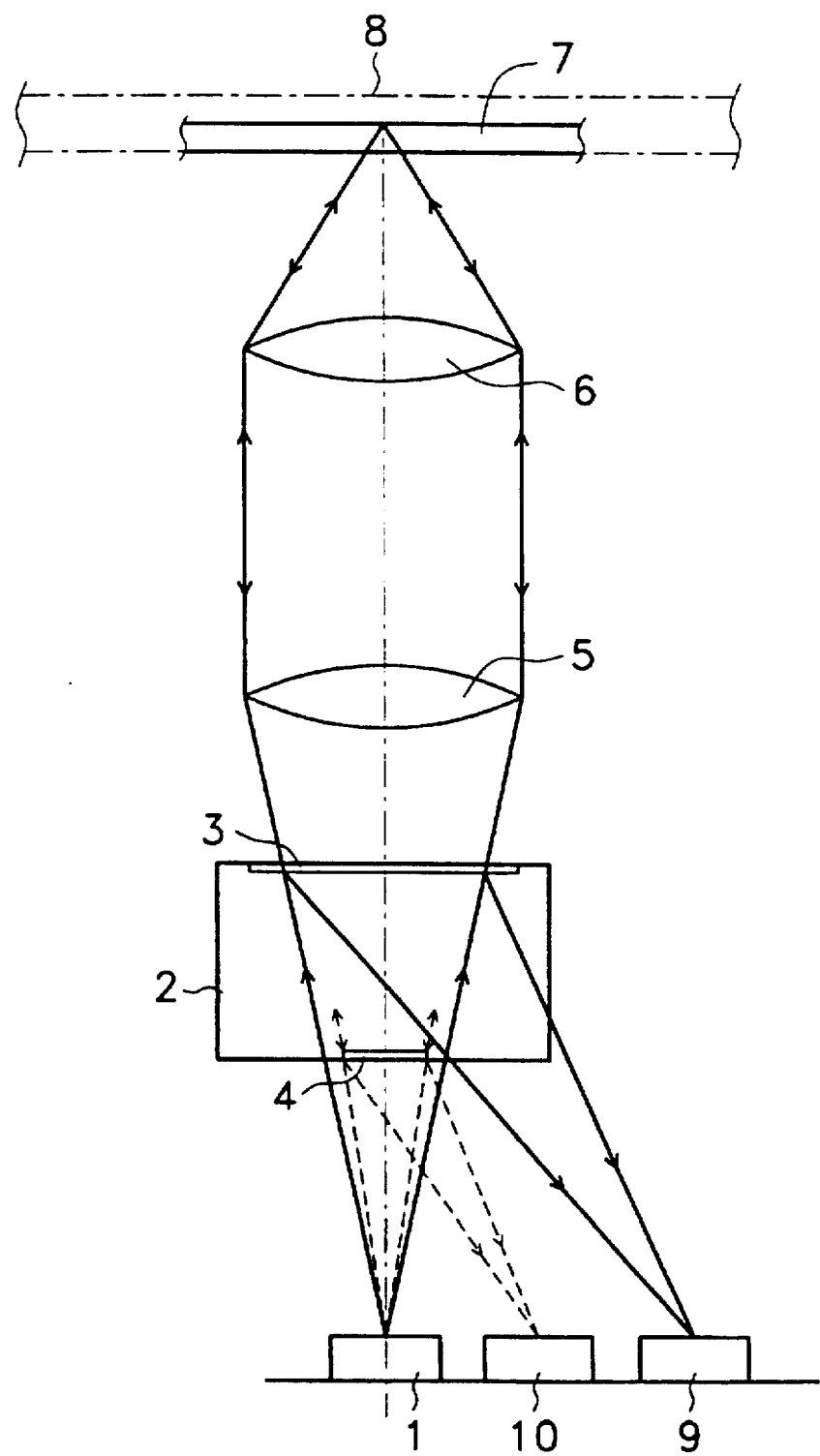
FIG. 1 is a schematic constructional view of a conventional optical pick-up using a hologram.
Figure 2:
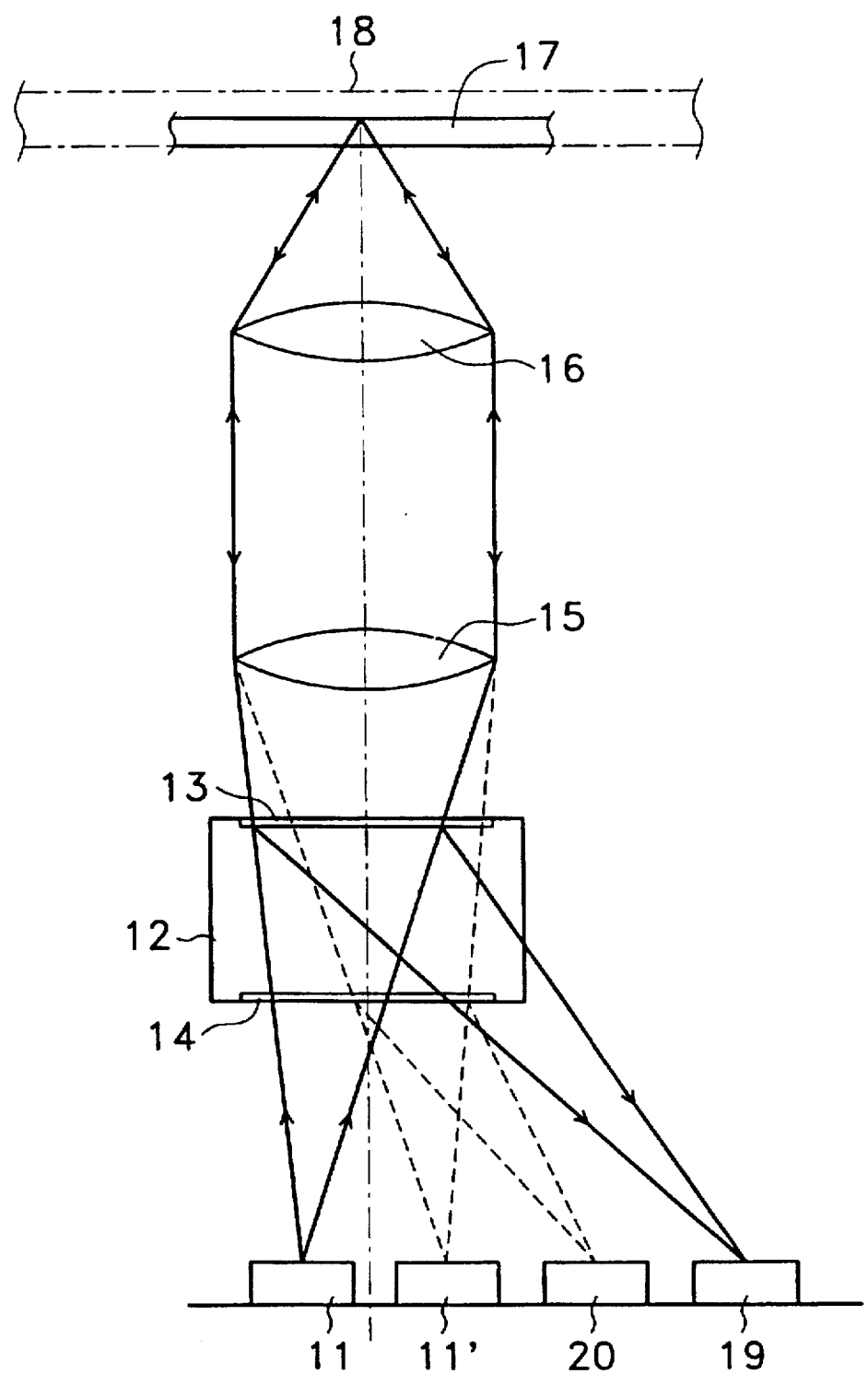
FIG. 2 is a schematic constructional view of an optical pick-up according to a preferred embodiment of the present invention, in which holograms are used for diffracting laser beams.

FIG. 2 schematically illustrates an optical pick-up according to a preferred embodiment of the present invention. The hologram optical pick-up has two laser diodes respectively emitting laser beams having different wavelengths as laser sources. When recording and reproducing the data on and from a disc, the hologram optical pick-up selects the laser diode having a suitable wavelength for the disc. As shown in FIG. 2, the hologram optical pick-up according to the present invention includes first and second laser diode 11 and 11', a hologram plate 12 having first and second hologram 13 and 14 at both sides thereof, a collimate lens 15, an objective lens 16, and first and second photo detectors 19 and 20.

Reference numerals 17 and 18 indicate discs having a different thickness from each other. A disc 17 having a thinner thickness is a digital compact disc, and a disc 18 having a thicker thickness is a compact disc or a recordable compact disc. One of discs 17 and 18 is loaded into an optical pick-up apparatus in order for the hologram optical pick-up to record and reproduce data on and from the selected disc.

The first and second laser diode 11 and 11', respectively, emit laser beams having different wavelengths. The first laser diode 11 emits a laser beam having a wavelength of 670 nm for the digital video disc 17 and the second laser diode 11' emits a laser beam having a wavelength of 780 nm for the compact disc or the recordable compact disc. The first and second laser diodes 11 and 11' are disposed on the same surface together with the first and second photo detectors 19 and 20.

A transparent substrate such as glass, is used as the hologram plate 12 and has the first and second holograms 13 and 14 formed at both sides thereof. The first and second holograms 13 and 14, respectively, diffract the laser beams when the laser beams respectively emitted from the first and second laser diode 11 and 11' are reflected by the surface of the discs. The first hologram 13 diffracts the laser beam which is emitted from the first laser diode 11 and reflected by a surface of the thinner disc 17 such as the digital video disc. At this time, the laser beam which is emitted from the second laser diode 11' and reflected by the surface of the thinner disc 17 passes through the first hologram 13 without diffraction. In the case of diffracting the laser beam by using the second hologram, the second hologram 14 diffracts the laser beam which is emitted from the second laser diode 11' and reflected by a surface of the thick disc 18 such as the compact disc. At this time, the laser beam which is emitted from the first laser diode 11 and reflected by the surface of the thick disc 18 passes through the second hologram 14 without diffraction.

The objective lens 16 having a high numerical aperture is used in the hologram optical pick-up in order to form a spot on the surface of the thinner disc 17. When the objective lens 16 is used to form the spot on the surface of the thick disc 18, an aberration of the laser beams is increased due to the thickness difference of the thin disc and the thick disc. The increasing of the aberration of the laser beams can be prevented by reducing an area of the second hologram 14 or by using a laser diode having a small emitting angle such as the second laser diode 11'.

In the hologram optical pick-up according to the present invention as described above, while recording and reproducing data on and from the thinner disc 17 such as a digital video disc, the first laser diode 11 having a short wavelength is used to record and reproduce the data on and from the thinner disc 17. While recording and reproducing data on and from the thick disc 18 such as a compact disc or a recordable compact disc, the second laser diode 11' having a long wavelength is used to record and reproduce the data on and from the thick disc 18.

In the case of reproducing the data from the thinner disc 17, the laser beams emitted from the first laser diode 11 pass through the first and second hologram 13 and 14 of the hologram plate 12 and are modulated into parallel beams by the collimate lens 15. Then, the laser beams are focused into a spot by the objective lens 16 on the surface of the disc 17 and reflected by the surface of the disc 17. The reflected laser beams pass again through the objective lens 16 and the collimate lens 15 and are diffracted by the first hologram 13. Then, the laser beams are detected by the first photo detector 19.

In the case of reproducing the data from the thick disc 18, the laser beams emitted from the second laser diode 11' pass through the first and second hologram 13 and 14 of the hologram plate 12 and are modulated into parallel beams by the collimate lens 15. Then, the laser beams are focused by the objective lens 16 on the disc 18. At this time, the laser beams pass through a portion, for example a short axis portion, at which the numerical aperture of the objective lens is small. Thereby, the aberration due to the thickness difference of the disc 17 and disc 18 is compensated. The laser beams are reflected by the surface of the disc 18. The reflected laser beams pass again through the objective lens 16, the collimate lens 15, and the first hologram 13. Then, the laser beams are diffracted by the second hologram 14 and detected by the second(photo detector 20.

According to the present invention, as described above, a disadvantage in that the aberration is increased due to the thickness difference of the disc 17 and 18 can be overcome by using two laser diodes having different wavelengths. Furthermore, the hologram optical pick-up can reproduce the data from a recordable disc having a different recording substrate, such as a phase changeable disc, without loss of the data. Accordingly, the hologram optical pick-up according to the present invention has an advantage in that discs having different thicknesses can be used in the hologram optical pick-up.

The hologram optical pick-up according to the present invention has an increased performance thereof by providing a suitable optical environment for the discs. The holograms respectively diffract the laser beams having different wavelengths, resulting in minimizing the loss of the laser beams, preventing a deterioration of the data, and improving a diffraction efficiency of the laser beams.

While the present invention has been particularly shown and described with reference to the particular embodiment thereof, it will be understood by those skilled in the art that various changes in form and details may be effected therein without departing from the spirit and scope of the invention as defined by the appended claims.

What is claimed is:

1. A hologram optical pick-up using two laser sources comprising:

first and second laser sources for respectively emitting laser beams having a different wavelength;

an objective lens for focusing said laser beams emitted from said first and second laser sources on surfaces of discs having a different thickness;

a hologram plate having first and second holograms formed on both sides thereof, said first and second holograms respectively diffracting said laser beams which are emitted from said first and second laser sources and reflected by said discs; and first and second photo detectors for receiving said laser beams which are reflected by said discs and diffracted by said first and second holograms so as to detect signals.

2. A hologram optical pick-up using two laser sources as claimed in claim 1, wherein said first laser source emits a laser beam having a wavelength of 670 nm and said second laser source emits a laser beam having a wavelength of 780 nm.

3. A hologram optical pick-up using two laser sources as claimed in claim 2, wherein said discs having the different thickness include a digital video disc and a compact disc.

4. A hologram optical pick-up using two laser sources as claimed in claim 2, wherein said discs having the different thickness include a digital video disc and a recordable compact disc.

5. A hologram optical pick-up using two laser sources as claimed in claim 1, wherein said first and second laser sources and said first and second photo detectors are disposed on a same surface.

6. A hologram optical pick-up using two laser sources as claimed in claim 1, wherein said first hologram only diffracts said reflected laser beam of said first laser source corresponding thereto and said second hologram only diffracts said reflected laser beam of said second laser source corresponding thereto.

7. A hologram optical pick-up using two laser sources as claimed in claim 1, further comprising a collimate lens for modulating said laser beams to be parallel with each other, wherein said collimate lens receives said laser beams passed through said hologram plate.

* * * * *